(12) United States Patent
Yun et al.

(10) Patent No.: US 9,381,684 B2
(45) Date of Patent: Jul. 5, 2016

(54) MOBILE PHONE PROTECTION CASE FILM WITH TRANSPARENT PART AND METHOD FOR MANUFACTURING SAME

(71) Applicants: Nam Woon Yun, Anyang-si (KR); Min Seok Yun, Anyang-si (KR); Young Kyu No, Seoul (KR); Soo Hyun Ayu, Anyang-si (KR)

(72) Inventors: Nam Woon Yun, Anyang-si (KR); Min Seok Yun, Anyang-si (KR); Young Kyu No, Seoul (KR); Soo Hyun Ayu, Anyang-si (KR)

( * ) Notice: Subject to any disclaimer, the term of this patent is extended or adjusted under 35 U.S.C. 154(b) by 0 days.

(21) Appl. No.: 14/433,033

(22) PCT Filed: Nov. 1, 2013

(86) PCT No.: PCT/KR2013/009840
§ 371 (c)(1),
(2) Date: Apr. 1, 2015

(87) PCT Pub. No.: WO2014/181939
PCT Pub. Date: Nov. 13, 2014

(65) Prior Publication Data
US 2016/0046049 A1    Feb. 18, 2016

(30) Foreign Application Priority Data

May 7, 2013  (KR) .......................... 10-2013-0051491
May 29, 2013 (KR) .......................... 10-2013-0060963

(51) Int. Cl.
*H04M 1/00* (2006.01)
*B29C 45/00* (2006.01)
(Continued)

(52) U.S. Cl.
CPC ............. *B29C 45/0025* (2013.01); *A45C 11/00* (2013.01); *B29C 45/14778* (2013.01);
(Continued)

(58) Field of Classification Search
CPC  B29C 45/0025; B29C 45/2708; B29C 45/38; B29C 2045/0027; B29C 2045/2716; A45C 11/00; A45C 2011/002; A45C 2200/10; B29L 2031/3437; B29L 2031/348; B29K 2069/00
USPC ....................................................... 455/575.8
See application file for complete search history.

(56) References Cited

U.S. PATENT DOCUMENTS

2009/0308511 A1* 12/2009 Dai ........................ A45C 11/00
                                                                        150/165

FOREIGN PATENT DOCUMENTS

KR    10-2012-0053864    5/2012
KR    10-1173918         8/2012
KR    20-0464076         12/2012

OTHER PUBLICATIONS

English Specification of 20-0464076.
(Continued)

*Primary Examiner* — Nader Bolourchi
(74) *Attorney, Agent, or Firm* — Antonio Ha & U.S. Patent LLC (57) ABSTRACT

The present invention relates to a mobile phone protection case film with a transparent part and a method for manufacturing the same, and specifically a method for manufacturing a protection case film inserted in a protection case cover hinged to one side of a protection case for receiving the back and the sides of a mobile phone so as to open or close the front of the mobile phone, includes the steps of: assembling a first die and a second die so as to form a cavity conforming with the shape of the protection case film; filling the cavity with a molten resin through a gate provided in one side of the cavity; compressing the molten resin filling the cavity by closely contacting the first die and the second die with each other; cooling or hardening the molten resin; removing the molded product by separating the first die and the second die; and cutting off the gate from the molded product. Thus, the method can considerably reduce the processing time and cost compared to the conventional processing method using a numerically controlled processing machine, and minimize the flaw rate by eliminating the errors according to the skill of a worker so as to improve the reliability of the product.

7 Claims, 8 Drawing Sheets

(51) Int. Cl.
  *B29C 45/14*  (2006.01)
  *B29C 45/27*  (2006.01)
  *A45C 11/00*  (2006.01)
  *B29C 45/38*  (2006.01)
  B29L 31/34  (2006.01)
  B29K 69/00  (2006.01)

(52) U.S. Cl.
  CPC ............ *B29C45/2708* (2013.01); *B29C 45/38* (2013.01); *A45C 2011/002* (2013.01); *A45C 2200/10* (2013.01); *B29C 2045/0027* (2013.01); *B29C 2045/2716* (2013.01); *B29K 2069/00* (2013.01); *B29L 2031/3437* (2013.01); *B29L 2031/3481* (2013.01)

(56) References Cited

OTHER PUBLICATIONS

English Specification of 10-1173918.
English Specification of 10-2012-0053864.

* cited by examiner

MOBILE PHONE PROTECTION CASE FILM WITH TRANSPARENT PART AND METHOD FOR MANUFACTURING SAME

TECHNICAL FIELD

The present invention relates to a mobile phone protective case film with a transparent part and a method for manufacturing the same, which may minimize manufacture time and costs by manufacturing the film by injection molding instead of conventional individual processing using a machine tool and may enhance product reliability by preventing warps that may occur upon injection molding.

DISCUSSION OF RELATED ART

As the use of mobile phones, including smartphones, e.g., the Galaxy™ or Iphone™, becomes more and more commonplace, various accessories for mobile phones are coming to market.

Among others, smartphones equipped with various functions are selling expensive, and accordingly, protective cases are gaining popularity to protect the phones.

Figure 1:
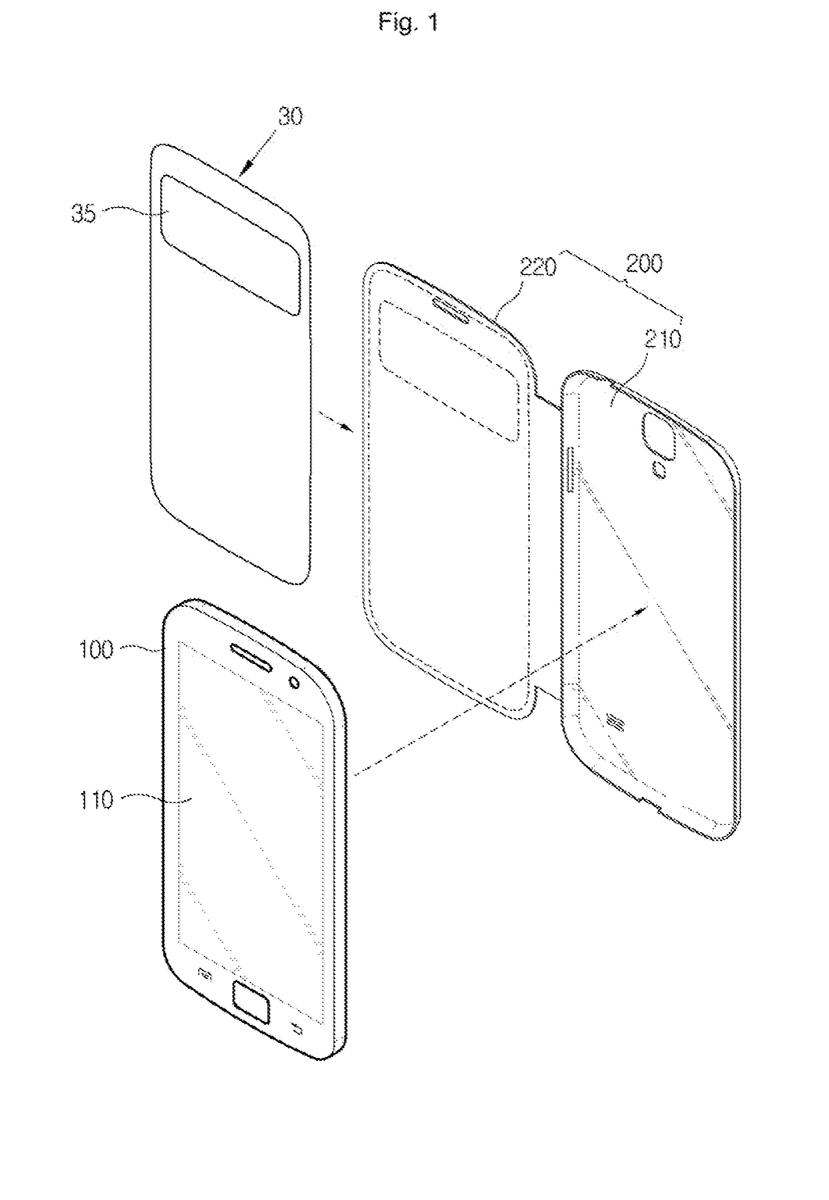
FIGS. 1 and 2 are views illustrating an example of putting in a mobile phone protective case film with a transparent part according to an embodiment of the present invention.

Referring to FIG. 1, a protective case typically includes a case body 210 covering the rear and side surfaces of a mobile phone 100 thereof and a case cover 220 rotatably coupled with the case body 210 at a side thereof to open and close the front surface of the mobile phone 100.

A protective case film 30 is placed inside the case cover 220 to maintain the shape of the case cover 220 and to protect the front surface 110 of the mobile phone 100.

Such protective case film has been conventionally manufactured by performing individual processing on a material e.g., polycarbonate resin, using a machine tool, such as a numerically controlled (NC) machine.

As such, the manufacture of protective case films is carried out individually, i.e., unit-by-unit, resulting in low production efficiency and increased manufacture costs.

Further, such manufacturing process presents processing errors varying depending on the skills of the workers manipulating the machine tool, thus failing to allow finished products a constant level of reliability.

SUMMARY

Accordingly, an object of the present invention is to provide a mobile phone protective case film and a method for manufacturing the same, which may remarkably reduce processing time and costs as compared with conventional, numerically controlled machine tools and minimize defect rate by eliminating the likelihood that an errors occurs depending on the worker's skill, thus enhancing product reliability.

According to the present invention, the above object is achieved by a method for manufacturing a mobile phone protective case film, having a transparent part and inserted in a protective case cover, the protective case cover rotatably provided on a side surface of a protective case main body covering a rear surface and a side surface of the mobile phone, the method comprising the steps of combining a first mold and a second mold separate from the first mold to form a cavity corresponding to a shape of the protective case film; injecting a molten resin through a gate provided at a side of the cavity to fill the cavity; bring the first mold and the second mold in tight contact with each other to compress the molten resin filling the cavity; cooling or hardening the molten resin; separating the first mold and the second mold and taking a formed article out; and cutting the gate away from the formed article, wherein the gate is provided as any one of a side gate formed at a side of the cavity, corresponding to a side suffice of the protective case film or one or more pin gates formed at a side of the cavity, corresponding to a plate surface of the protective case film 30 to prevent the protective case film from being bent by heat or pressure upon injection of the molten resin.

The protective case film may have a relatively thick transparent part at a side thereof the transparent part allowing the front surface of the mobile phone to be partially exposed to an outside while the case cover is positioned on the front surface of the mobile phone, and the molten resin may contain a polycarbonate resin and an acrylic resin that are mixed in a weight ratio from 7:3 to 9:1.

The gate may be provided as any one of a side gate that is formed at a side of the cavity, corresponding to a side surface of the protective case film, or one or more pin gates formed at a side of the cavity, corresponding to a plate surface of the protective case film so as to prevent the protective case film from being warped by heat and pressure upon injection of the molten resin.

The side gate may be provided at a longitudinal-direction side of the protective case film.

The side gate may be provided, at a longitudinal-direction side relatively away from the transparent part.

The side gate may be provided at a hole region corresponding to a microphone or speaker of the mobile phone, and after injection molding, may be together removed upon, forming the hole.

A protection film may be further provided on one or more of both surfaces of the transparent part to protect the transparent part and to increase the hardness of the protection part, and the protection film may be previously positioned in the cavity corresponding to the transparent part, and the molten resin may be injected.

The cavity may be formed in a shape curved in an opposite direction of a direction in which the protective case film is warped by heat or pressure upon injection of the molten resin, so as to fix the warp of the protective case film.

Meanwhile, the above object is also achieved by a mobile phone protective case film with a transparent part, as manufactured by each of the manufacture methods.

Accordingly, the present invention may remarkably reduce processing time and costs as compared with conventional numerically controlled machine tools and minimize defect rate by eliminating the likelihood that an errors occurs depending on the worker's skill, thus enhancing product reliability.

Further, as the cavity may be shaped considering a warp or an enhanced gate structure, the present invention may prevent warps from occurring when the molten resin is cooled and hardened by minimizing the temperature or pressure gradient that may occur in the cavity upon injection of the molten resin

DESCRIPTION OF EXEMPLARY EMBODIMENTS

Hereinafter, the present invention is described in detail with reference to the accompanying drawings.

Figure 6:
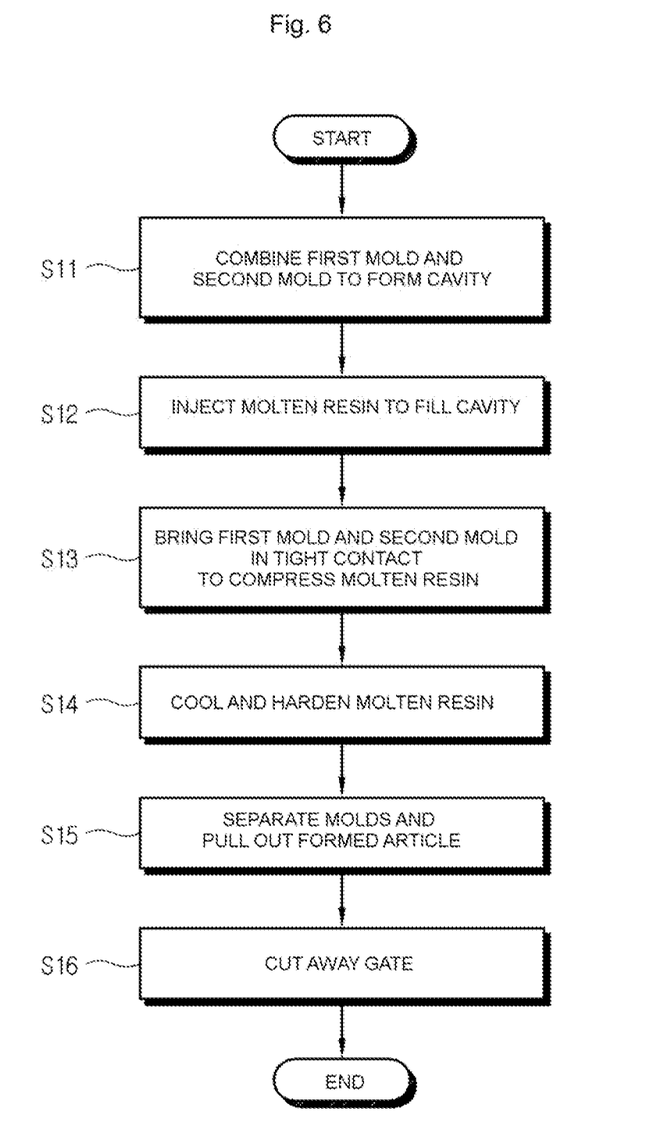
FIG. 6 is a flowchart illustrating a method for manufacturing a mobile phone protective case film with a transparent part according to an embodiment of the present invention.

Referring to FIG. 6, according to an embodiment of the present invention, a method for manufacturing a mobile phone protective case film, with a transparent part, includes the steps of combining a first mold and a second mold separate from the first mold to form a cavity corresponding to a shape of the protective case film 30 (S11); injecting a molten resin through a gate 300 provided at a side of the cavity to fill the cavity (S12); bring the first, mold and the second mold in tight contact with each other to compress the molten resin filling the cavity (S13); cooling or hardening the molten resin (S14); separating the first mold and the second mold and taking a formed article out (S15); and cutting the gate 300 away from the formed article (S16).

Accordingly, the present invention may remarkably reduce processing time and costs as compared with conventional numerically controlled machine tools and minimize defect rate by eliminating the likelihood that an errors occurs depending on the worker's skill, thus enhancing product reliability.

That is, multiple cavities may be formed in the mold by the above method. Accordingly, a plurality of protective case films may be formed at the same time, remarkably shortening production time. Further, the work is done only by cutting the gate after injection molding. This simplifies the process and eliminates the likelihood of occurrence of an error dependent on the worker's skill. Therefore, product reliability may be maximized.

The protective case film 30 is provided inside the case cover 220 to support the shape of the case cover 220 while protecting the front surface 110 of the mobile phone 100.

Figure 2:
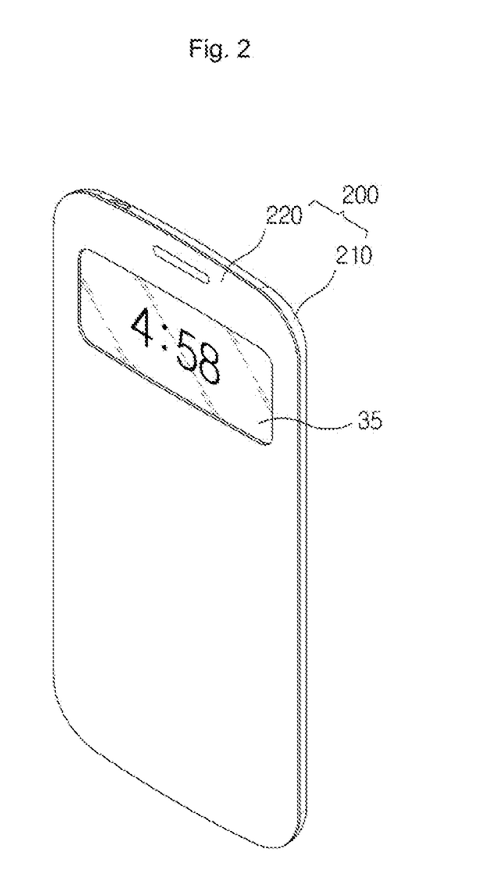

The overall protective case film 30 may be provided inside the case cover 220, or as shown in FIG. 2, the protective case film 30 may be provided to be partially exposed to the outside.

That is, the protective case film 30 may be provided with a light-transmissive transparent part 35 to allow the front surface 110 of the mobile phone 100 to be partially exposed to the outside while the front surface of the mobile phone 100 is covered with the case cover 220 (so that time or call reception can be checked even without, opening the case cover 220).

In such case, the protective case film 30 should have light transmittance. The molten resin, may be provided by mixing a polycarbonate resin and an acrylic resin.

In this case, the polycarbonate resin and the acrylic resin are preferably mixed in a weight ratio from 7:3 to 9:1.

Acrylic resin has high light transmittance, but is relatively low in strength and vulnerable to scratches. The mixing ratio has been obtained, by repeated experiments to reinforce the strength and anti-scratch property of the protective case film 30 while providing a light transmittance necessary for the protective case film 30.

Figure 3:
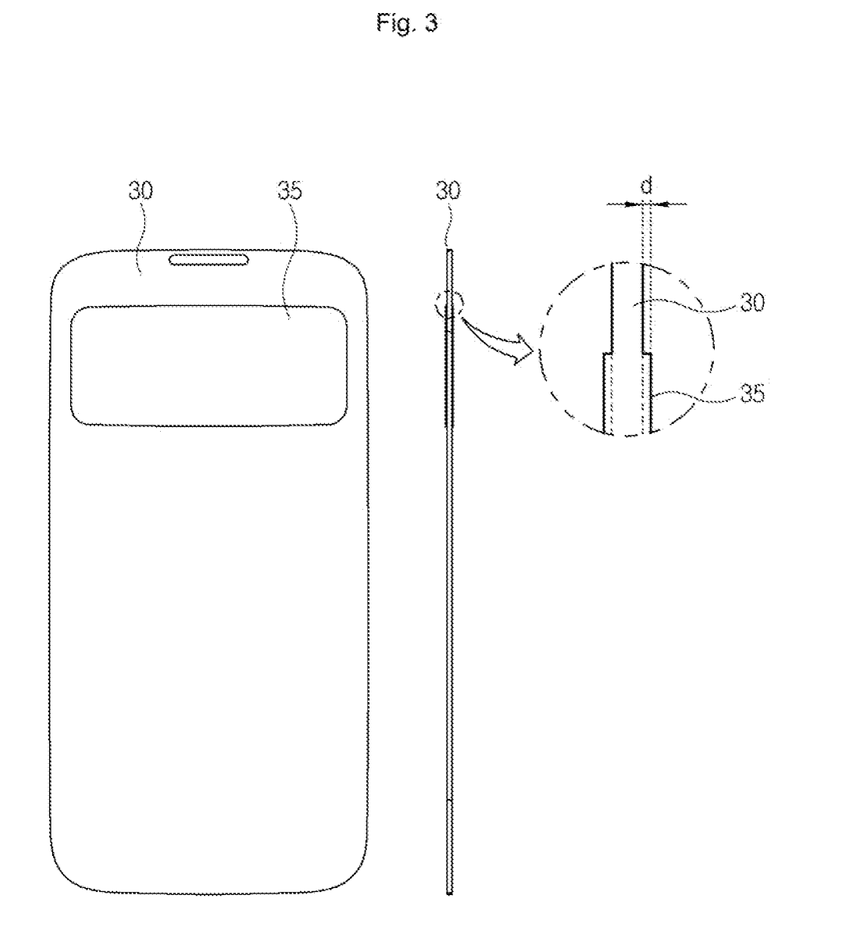
FIG. 3 is a view illustrating the front surface and a side surface of a mobile phone protective case film with a transparent part according to an embodiment of the present invention.

The transparent part 35 may be provided to be relatively thicker than the protective case film 30 as shown in FIG. 3. A thickness d may be provided corresponding to the thickness of the case cover 220, so that the transparent part 35 is provided at the same height as the case cover 220.

Meanwhile, various types of functional films may be attached onto the transparent part 35 to enhance the light transmittance and protect the surface of the transparent part 35.

Figure 7:
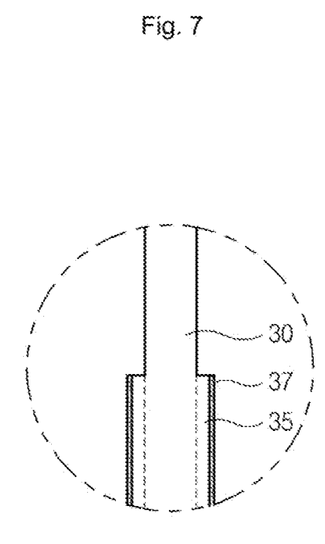
FIG. 7 is a view illustrating an example of a side gate formed according to another embodiment of the present invention.

For example, as shown in FIG. 7, a film 37 for increasing the hardness of the transparent part 35 may be attached onto each or either of the two opposite surfaces of the transparent part 35.

In such case, after the film 37 is provided in the cavity; the molten resin is injected, so that, the film 37, together with the protective case film 30, may be injection-molded.

This eliminates the need of a process of separately attaching the film 37 after forming the protective case film 30, thus simplifying the process and reducing manufacturing time.

Further, the film 37 and the protective case film 30 are attached together while injected (in other words, they are attached, together, while in molten phase), allowing for increased, adhesion.

The gate 300 may be provided as any one of a side gate 310 that is formed at a side of the cavity, corresponding to a side surface of the protective case film 30, or one or more pin gates 350 formed at a side of the cavity, corresponding to a plate surface of the protective case film 30.

In other words, upon injection molding, a temperature or pressure gradient, starting from the gate 300, may be caused by the injected molten resin. Accordingly, as the molten resin is cooled or hardened, a warp may be created due to internal stress.

As such, the case cover may warp, causing it to float without evenly contacting the surface of the mobile phone. Moreover, it spoils the appearance and causes inflow of foreign materials and resultantly the risk of damage.

Figure 4:
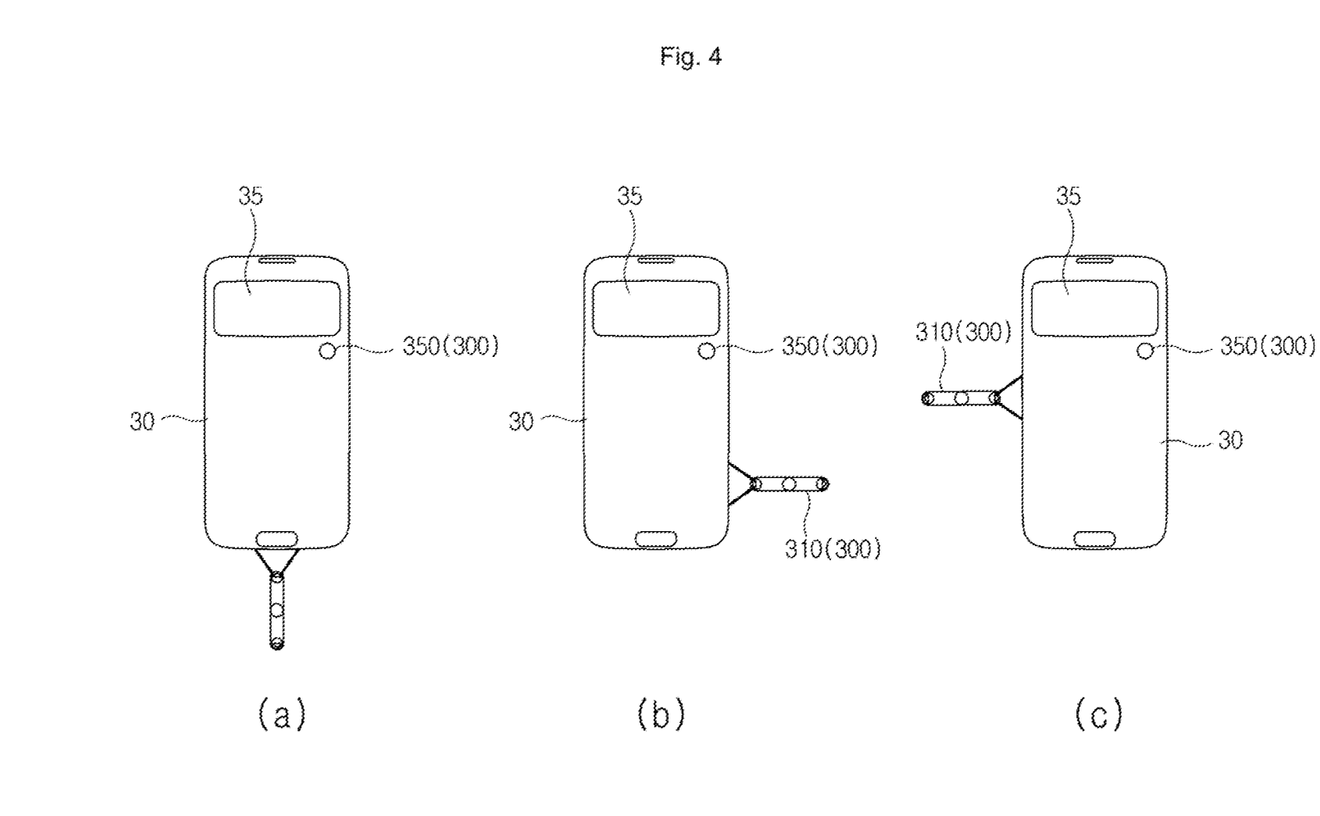
FIG. 4 is a view illustrating examples of forming a side gate according to various embodiments of the present invention.

The present invention may prevent warps from occurring when the molten resin is cooled and hardened by minimizing the temperature or pressure gradient that may occur in the cavity upon injection of the molten resin As shown in FIG. 4, the side gate 310 may be provided at a side in a longitudinal direction (refer to (a)) or at a side in a width direction (refer to (b) or (c)).

In this case, the side gate 310 is preferably provided at a side in a longitudinal direction of the protective case film 30.

This is why the temperature or pressure gradient is relatively large around the gate 310, and accordingly, the temperature and pressure gradient deviation in the remainder of the protective case film 30 may be left constant by forming the gate at the longitudinal-direction side.

Further, the side gate 310 may be provided at a longitudinal-direction side that is relatively away from the transparent part 35. Because of a relatively low temperature and pressure gradient deviation, the transparent part 35 and its surroundings experience a low level of warping, ending up with a relatively high degree of flatness as compared with the remainder of the protective case film 30.

Figure 8:
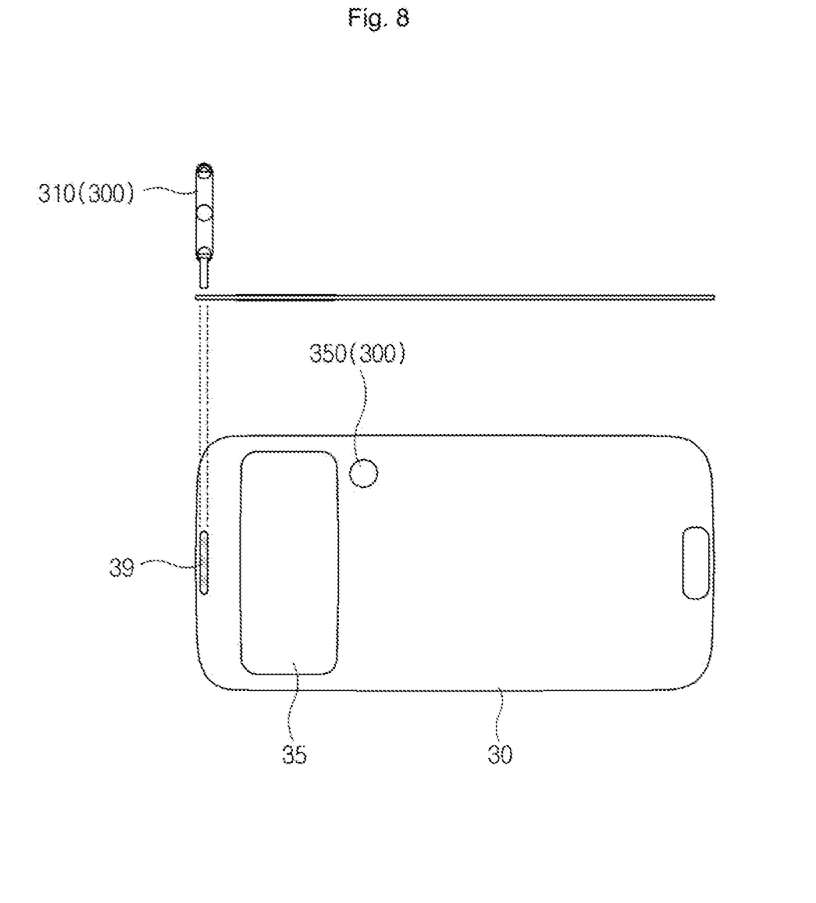
FIG. 8 is a cross-sectional view illustrating a mobile phone protective case film according to still another embodiment of the present invention.

Or, as shown in FIG. 8, the gate 300 may be formed at a hole 39 provided at the position corresponding to the speaker or microphone of the mobile phone, and after injection molding, may be removed while the hole 39 is formed. In such case, the hole 39 may be formed while simultaneously cutting away the gate 300, thus shortening the process.

Figure 5:
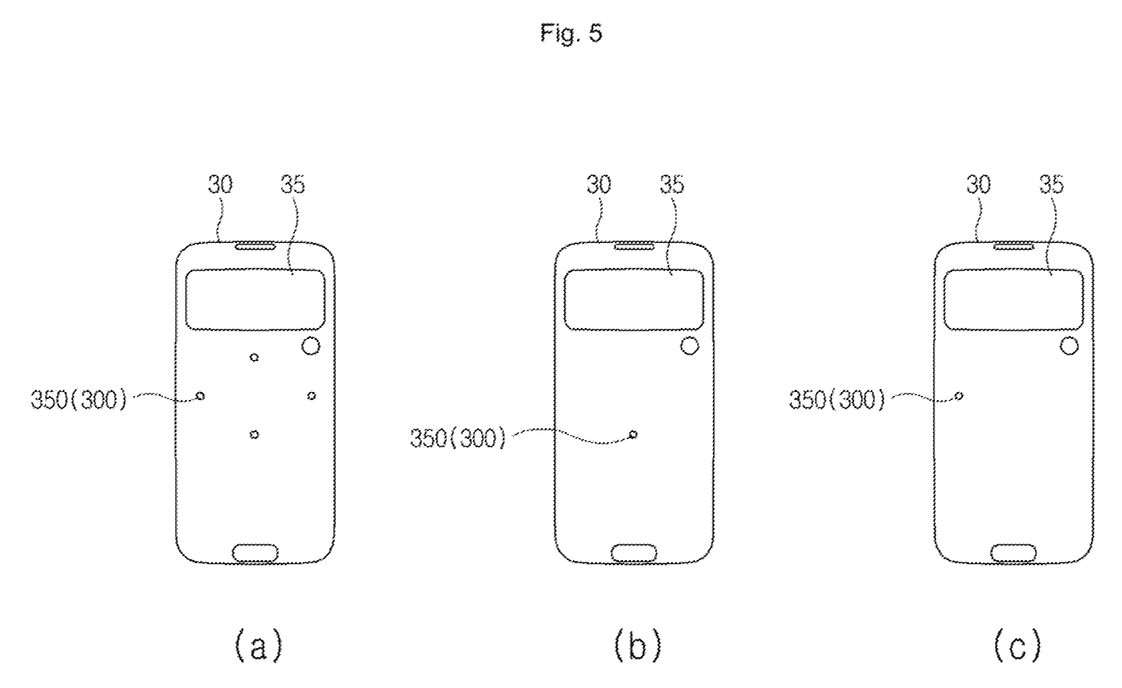
FIG. 5 is a view illustrating examples of forming a pin gate according to various embodiments of the present invention.

One or more pin gates 350 may be provided in a plate surface direction of the protective case film 30 as shown in FIG. 5, so that multiple injection holes are formed to thus minimize the temperature and pressure gradient deviations on the front surface of the protective case film 30.

Or, the cavity may be formed in a shape curved in an opposite direction of a direction in which the protective case film 30 is bent by heat or pressure upon injection of the molten resin, so as to fix the bent protective case film 30.

In other words, considering that the protective case film 30 may warp when cooled or hardened, the cavity may be previously shaped in an opposite direction of the direction of the warp, so that the warp may trade off the initial shape upon injection of the molten resin.

Thereafter, the formed article may be pulled out form the first and second mold, and the gate 300 is then cut away, forming the protective case film 30.

What is claimed is:

1. A method for manufacturing a mobile phone protective case film, having a transparent part and inserted in a protective case cover, the protective case cover rotatably provided on a side surface of a protective case main body covering a rear surface and a side surface of the mobile phone, the method comprising the steps of:
   combining a first mold and a second mold separate from the first mold to form a cavity corresponding to a shape of the mobile phone protective case film;
   injecting a molten resin through a gate provided at a side of the cavity to fill the cavity;
   bring the first mold and the second mold in tight contact with each other to compress the molten resin filling the cavity; and
   cooling or hardening the molten resin; separating the first mold and the second mold and taking a formed article out; and cutting the gate away from the formed article,
   wherein the gate is provided as any one of a side gate formed at a side of the cavity, corresponding to a side surface of the mobile phone protective case film or one or more pin gates formed at a side of the cavity, corresponding to a plate surface of the mobile phone protective case film to prevent the mobile phone protective case film from being bent by heat or pressure upon injection of the molten resin,
   wherein the transparent part is thick at a side of the mobile phone protective case film, the transparent part allowing the front surface of the mobile phone to be partially exposed to an outside while the protective case cover is positioned on the front surface of the mobile phone, and
   wherein the molten resin contains a polycarbonate resin and an acrylic resin that are mixed in a weight ratio from 7:3 to 9:1.

2. A method for manufacturing a mobile phone protective case film, having a transparent part and inserted in a protective case cover, the protective case cover rotatably provided on a side surface of a protective case main body covering a rear surface and a side surface of the mobile phone, the method comprising the steps of combining a first mold and a second mold separate from the first mold to form a cavity corresponding to a shape of the mobile phone protective case film; injecting a molten resin through a gate provided at a side of the cavity to fill the cavity; bring the first mold and the second mold in tight contact with each other to compress the molten resin filling the cavity; cooling or hardening the molten resin; separating the first mold and the second mold and taking a formed article out; and cutting the gate away from the formed article, wherein the gate is provided as any one of a side gate formed at a side of the cavity, corresponding to a side surface of the mobile phone protective case film or one or more pin gates formed at a side of the cavity, corresponding to a plate surface of the mobile phone protective case film to prevent the mobile phone protective case film from being bent by heat or pressure upon injection of the molten resin, wherein the side gate is provided at a side in a longitudinal direction of the mobile phone protective case film.

3. The method of claim 1, wherein the side gate is provided at a longitudinal-direction side away from the transparent part.

4. The method of claim 3, wherein the side gate is formed in a hole area corresponding to a speaker or microphone of the mobile phone, and after injection molding, is together removed while a hole is formed.

5. The method of claim 1, wherein a protection film is further provided on one or more surfaces of the transparent part to protect the transparent part and to increase the hardness of the protection part, and wherein the protection film is previously positioned in a cavity corresponding to the transparent part, and the molten resin is injected.

6. A method for manufacturing a mobile phone protective case film, having a transparent part and inserted in a protective case cover, the protective case cover rotatably provided on a side surface of a protective case main body covering a rear surface and a side surface of the mobile phone, the method comprising the steps of:
   combining a first mold and a second mold separate from the first mold to form a cavity corresponding to a shape of the protective case film;
   injecting a molten resin through a gate provided at a side of the cavity to fill the cavity;
   bring the first mold and the second mold in tight contact with each other to compress the molten resin filling the cavity; and
   cooling or hardening the molten resin; separating the first mold and the second mold and taking a formed article out; and cutting the gate away from the formed article,
   wherein the cavity is provided in a shape curved in an opposite direction of a direction in which the mobile phone protective case film will wrap by heat and pressure upon injection of the molten resin to prevent any warp of the mobile phone protective case film from occurring,
   wherein the transparent part is thick at a side of the mobile phone protective case film, the transparent part allowing the front surface of the mobile phone to be partially exposed to an outside while the protective case cover is positioned on the front surface of the mobile phone, and
   wherein the molten resin contains a polycarbonate resin and an acrylic resin that are mixed in a weight ratio from 7:3 to 9:1.

7. A mobile phone protective case film having a transparent part and manufactured by a method for manufacturing the mobile phone protective case film, having the transparent part and inserted in a protective case cover, the protective case cover rotatably provided on a side surface of a protective case main body covering a rear surface and a side surface of the mobile phone, the method comprising the steps of combining a first mold and a second mold separate from the first mold to form a cavity corresponding to a shape of the mobile phone protective case film; injecting a molten resin through a gate provided at a side of the cavity to fill the cavity; bring the first mold and the second mold in tight contact with each other to compress the molten resin filling the cavity; cooling or hardening the molten resin; separating the first mold and the second mold and taking a formed article out; and cutting the gate away from the formed article, wherein the gate is provided as any one of a side gate formed at a side of the cavity, corresponding to a side surface of the mobile phone protective case film or one or more pin gates formed at a side of the cavity, corresponding to a plate surface of the mobile phone protective case film to prevent the mobile phone protective case film from being bent by heat or pressure upon injection of the molten resin.

* * * * *